United States Patent
Cosby, II et al.

(10) Patent No.: US 6,601,405 B2
(45) Date of Patent: Aug. 5, 2003

(54) SINGLE-PASS, DIRECT-FIRED GENERATOR FOR AN ABSORPTION CHILLER

(75) Inventors: Ronald M. Cosby, II, La Crosse, WI (US); Jeffrey D. Harms, La Crosse, WI (US); Gordon C. Stewart, La Crosse, WI (US)

(73) Assignee: American Standard Inc., Piscataway, NJ (US)

( * ) Notice: Subject to any disclaimer, the term of this patent is extended or adjusted under 35 U.S.C. 154(b) by 121 days.

(21) Appl. No.: 10/014,964

(22) Filed: Oct. 22, 2001

(65) Prior Publication Data

US 2003/0074915 A1 Apr. 24, 2003

(51) Int. Cl.⁷ ............................................. F25B 33/60
(52) U.S. Cl. .......................................... 62/497; 67/476
(58) Field of Search .......................... 62/476, 497, 496, 62/101; 165/910

(56) References Cited

U.S. PATENT DOCUMENTS

| | | | |
|---|---|---|---|
| 3,266,266 A | 8/1966 | Reid, Jr. | |
| 4,487,036 A | * 12/1984 | Itoh et al. | ........................ 62/474 |
| 4,570,456 A | * 2/1986 | Reimann et al. | ............... 62/476 |
| 5,381,674 A | 1/1995 | Omori et al. | |
| 5,771,711 A | 6/1998 | Kubota | |
| 5,787,727 A | 8/1998 | Inoue et al. | |
| 5,816,070 A | * 10/1998 | Meckler | ........................ 62/476 |
| 5,832,742 A | 11/1998 | Kouri et al. | |
| 5,862,679 A | 1/1999 | Nakamura et al. | |
| 5,915,468 A | 6/1999 | Inoue et al. | |
| 6,145,338 A | 11/2000 | Nakamura et al. | |
| 6,279,343 B1 | 8/2001 | Funaba et al. | |
| 6,318,117 B1 | * 11/2001 | Jandal et al. | .................. 62/497 |
| 6,357,254 B1 | * 3/2002 | Xia | .............................. 62/476 |

FOREIGN PATENT DOCUMENTS

| | | | |
|---|---|---|---|
| JP | 52-147355 | 12/1977 | |
| JP | 64-70662 | 3/1989 | |
| JP | 404302963 A | * 10/1992 | .................. 62/476 |
| JP | 5-187740 | 7/1993 | |
| JP | 9-33134 | 2/1997 | |

* cited by examiner

*Primary Examiner*—Melvin Jones
(74) *Attorney, Agent, or Firm*—William J. Beres; William O'Driscoll

(57) ABSTRACT

A direct-fired generator for an absorption chiller includes an inner shell, in which combustion occurs, and an outer shell. The inner shell supports a tube bundle through which a first portion an absorption solution is conveyed. Combustion products makes a single pass across the tube bundle within the inner shell. Such construction minimizes the number of potential leak paths and facilitates leak testing of the generator at an intermediate stage of assembly. A flow distributor apportions solution flow to the tube bundle and to a second solution flow path which bypasses the tube bundle but which is likewise heated by the combustion occurring within the inner shell. The two solution flow paths converge after the solution flowing therethrough has been heated by the combustion occurring in the inner shell. A vapor separator disentrains solution in liquid form from vaporized solution before the vapor exits the generator.

36 Claims, 2 Drawing Sheets

SINGLE-PASS, DIRECT-FIRED GENERATOR FOR AN ABSORPTION CHILLER

BACKGROUND OF THE INVENTION

1. Field of the Invention

The present invention relates to a generator for an absorption cooling system. More particularly, the present invention relates to fluid flow patterns in a direct-fired generator of an absorption chiller.

2. Description of Related Art

Typical absorption chillers have a refrigerant or working fluid consisting of at least a two-part solution, such as a solution of lithium bromide and water or ammonia and water. Varying the solution's concentration by cyclically vaporizing and reabsorbing of the solution's two components allows for the use of a pump or multiple pumps to circulate the solution through the chiller to create a cooling effect.

In operation, one or more so-called generators add heat the solution to raise its absolute pressure and to vaporize one solution part. The vaporized part will be referred to hereinbelow as a weak or less concentrated solution and for a solution of lithium bromide and water, the term "weak solution" refers to pure or nearly pure water which may be found in a liquid or vaporous state downstream of the generator. For systems using a solution of ammonia and water, the weak solution is pure or nearly pure ammonia. The unvaporized portion of the solution in the generator is referred to as a more concentrated or strong solution.

Weak solution flows from the generator of an absorption chiller to a condenser where it is cooled and condensed to liquid form. From the condenser, the solution flows to and functions as a refrigerant within a relatively lower-pressure evaporator component. The lower pressure found in the evaporator causes the solution to expand. That expansion further lowers the solution's temperature and permits that solution to be used as a refrigerant to cool still another liquid, most typically water. That cooled liquid is then used as needed, such as to cool rooms or other areas of a building or in an industrial process application.

After performing its cooling function in the evaporator and vaporizing in the process, the weak solution migrates, in vaporous form, to the absorber component where it is reabsorbed resulting in the creation of a liquid solution of intermediate concentration. That solution is delivered to the generator component to repeat and gain the effect of the solution separation process.

A generator is referred to as being direct-fired if its source of heat is from direct combustion instead of from steam or waste heat delivered to the chiller from another process and/or location. In direct-fired generators, hot combustion gas is typically directed across the exterior of a tube set through which solution of intermediate concentration flows so as to heat the solution and cause the vaporization of a portion of it.

The heating of solution in a direct-fired generator often involves multiple passes of combustion gas across the tube set so as to extract as much heat from the combustion gas as possible. While efficient in that regard, multi-pass designs typically add significantly to the cost and complexity of a generator for the reason that such designs generally have more parts including, but not limited to, a turn box which redirects the flow of combustion gas from one pass across the tube set to another.

In so-called single-pass direct-fired generator designs, combustion gas makes only one pass across the tube set. In such designs, an outer shell often surrounds an inner combustion chamber. Combustion gas heats some of the solution as it travels vertically upward through the tube set and heats the rest of the solution as it travels upward between the inner and outer shells of the generator.

In practice, it can be very challenging to manufacture shell-within-shell units. Further, once the shells are assembled and welded together, it can be very difficult to find and repair any leaks between the two that might exist. Even a slight leak can dramatically affect an absorption chiller, not only from a performance standpoint, but from a reliability standpoint. In that regard, the leakage of air into an absorption chiller can lead to rapid and extensive corrosion inside the unit.

Other concerns with existing single-pass generator designs exist. For example, rapid upward flow and discharge of solution from the vertical tubes or from between the sides of inner and outer generator shells in such designs can create a geyser-like effect at the surface of the solution pool which is found just above the combustion chamber. Such disruption of the solution pool surface tends to cause the vaporous solution above that pool surface to entrain and carry liquid out of the generator and into the system condenser, evaporator, and, eventually, absorber. Any such liquid carryover reduces an absorption chiller's capacity.

The need continues to exist for a readily manufacturable single-pass direct-fired generator for an absorption chiller wherein the generator can be leak tested before final assembly and in which provision is made to minimize the carryover of liquid entrained in the vapor that flows out of the generator's interior.

SUMMARY OF THE INVENTION

It is an object of the present invention to provide an absorption chiller with a single-pass, direct-fired generator the inner shell of which can be fabricated and completely leak checked before fabricating the outer shell.

Yet another object of the present invention is to apportion liquid solution flow within a direct-fired generator between a first path, through the generator's tube bundle, and a second path, which bypasses the tube bundle, such that most of the heat transfer between combustion gas and solution occurs within the tube bundle.

A further object of the present invention is to provide a direct-fired generator having an inner shell in which less than half of the shell volume is taken up by a tube bundle.

A still further object of the present invention is to provide a single-pass, direct-fired generator with a vapor separator situated an appreciable distance away from the location of liquid solution discharged from the generator's tube bundle.

Yet another object of the present invention is to provide a vapor separator for a direct-fired generator having a geometry which inhibits the entry of liquid solution into the interior thereof yet out of which any liquid solution that does enter may readily drain.

Another object of the present invention is to provide a vapor separator for a direct-fired generator having flow deflectors that direct vapor-entrained liquid droplets away from the generator's vapor outlet and which assist in creating a vapor flow pattern that facilitates liquid disentrainment during the course of vapor flow therethrough.

Another object of the present invention is to provide a single-pass, direct-fired generator whose combustion gas inlet and vapor outlet are found in a common end plate.

These and other objects of the present invention are provided by a direct-fired generator for an absorption chiller that includes inner and outer shells having lower, generally U-shaped half-shells welded to inverted, generally U-shaped upper half-shells. The inner shell defines a combustion chamber and supports a tube bundle such that the combustion gas makes a single pass across the tube bundle. The majority of liquid solution flow within the generator is vertically upward through the tube bundle while a lesser liquid portion flows between the shells. A vapor separator is disclosed and is disposed within the generator so as to significantly limit the carryover of liquid solution out of the generator.

DESCRIPTION OF THE PREFERRED EMBODIMENT

Figure 1:
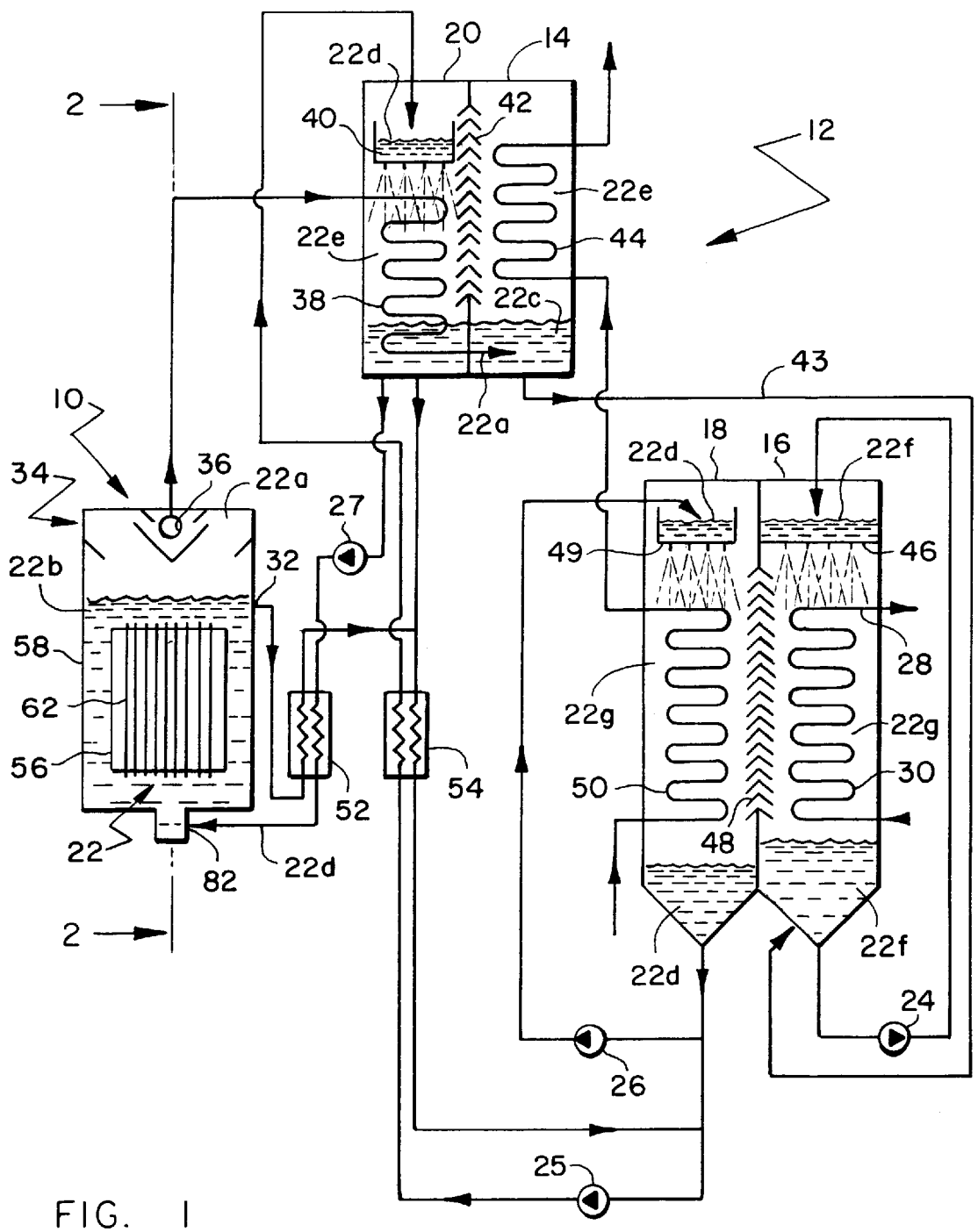
FIG. 1 is a schematic diagram of an absorption chiller that includes a single-pass, direct-fired generator.

Referring initially to FIG. 1, single-pass, direct-fired, high temperature generator 10 of the present invention is shown schematically to illustrate its relationship with other components of an exemplary absorption chiller 12. In addition to generator 10, other major components of chiller 12 include a condenser 14, an evaporator 16, an absorber 18 and a low temperature generator 20. It will be appreciated by those skilled in the art that generator 10 can readily be adapted for use in absorption chillers having different configurations, fluid circuiting and component layouts.

Chiller 12 makes use of a solution 22 which is a solution having at least one constituent that can be separated from and then reabsorbed into a second constituent. While chiller 12 will be described with reference to a solution consisting of water and lithium bromide, other solutions, such as ammonia and water, are also within the scope of the invention.

The concentration of solution 22 in the preferred embodiment will vary throughout chiller 12 from weak to strong with the weak solution being pure or nearly pure water. The phase of solution 22 will likewise vary from liquid to vapor/gas depending upon its location within the chiller.

Solution pumps 24, 25, 26 and 27 circulate solution 22 through the various components of chiller 12. The number and type of pumps employed by chiller 12 may vary from one chiller design to the next and is not material to the generator of the present invention.

The purpose of chiller 12 is to cool a liquid, indicated at 28, which passes through heat exchanger 30 of evaporator 16. Liquid 28 can be water, glycol, a mixture of water and glycol, or another fluid that is conveyed from chiller 12, once it has been cooled, to wherever it is needed. For example, liquid 28 can be circulated through a remote heat exchanger (not shown) used in an industrial process or to cool a room or other area within a building. The process by which liquid 28 is chilled will now be explained in the context of the various components of chiller 12, starting with direct-fired, high temperature generator 10.

Generator 10 heats solution 22 which creates within its confines a weak solution 22a, consisting primarily of water vapor, and a more concentrated solution 22b, consisting of water in the liquid state with a relatively high concentration of lithium bromide. Concentrated solution 22b exits generator 10 through a liquid outlet 32 while weak vaporous solution 22a passes through a liquid-vapor separator 34 prior to exiting the generator through a vapor outlet 36.

Following first the flow of weak vaporous solution 22a, from vapor outlet 36 of direct-fired generator 10, vaporous solution 22a passes through a heat exchanger 38, which is disposed within low temperature generator 20, in heat exchange contact with solution 22d. Solution 22d is of intermediate concentration and is distributed onto heat exchanger 38 from reservoir 40 within the low temperature generator as will further be described.

The heat from solution 22a vaporizes solution 22d within low temperature generator 20. This results in the creation of a weak vaporous solution 22e within the upper portion thereof and a more concentrated liquid solution 22b at the bottom thereof. Weak vaporous solution 22e migrates through vapor separator 42 into condenser 14.

A heat exchanger 44 exists within condenser 14 through which water flows. That water is often water which has been cooled by a conventional cooling tower. Heat exchange between the water flowing through heat exchanger 44 and vapor 22e within the condenser cools vapor 22e and causes it to condense. The condensate collects at the bottom of condenser 14 and mixes with weak solution 22a, which is received from heat exchanger 38 in the low temperature generator, to form a pool of relatively cool weak liquid solution 22c within the condenser.

Weak solution 22c is conveyed by line 43 to the relatively lower pressure evaporator 16. As this weak solution is fed into the relatively lower pressure evaporator it expands and its temperature drops further. As a result, a pool of weak liquid solution 22f of relatively low temperature is created within the evaporator. That solution is circulated upward within evaporator 16 by pump 24, is fed into reservoir 46 and is directed thereoutof onto heat exchanger 30. The flow of low temperature solution 22f onto heat exchanger 30 cools liquid 28 which it is, once again, the purpose of chiller 12 to cool.

As a result of the heat exchange process within the evaporator, solution 22f absorbs heat from liquid 28, vaporizes and migrates through a vapor separator 48 into absorber 18. Pump 26 circulates solution 22d of intermediate concentration to distributor 49 within absorber 18 which, in turn, distributes that solution onto heat exchanger 50. The distributed solution flows downward through heat exchanger 50 and through an atmosphere of vapor 22g within the absorber. As a result of this process, solution 22d absorbs vapor 22g and then collects at the bottom of the absorber.

Pump 25 then pumps solution 22d from the absorber to replenish the supply of more concentrated solution in low temperature generator 20 while pump 27 pumps solution from low temperature generator 20 to direct-fired generator 10 to replenish the supply of more concentrated solution there. As will be noted, as solution is conveyed to low temperature generator 10 and to direct-fired generator 20, it is preheated within heat exchangers 52 and 54 by the recovery of what otherwise would be waste heat from liquid solution that flows from the generators.

Figure 3:
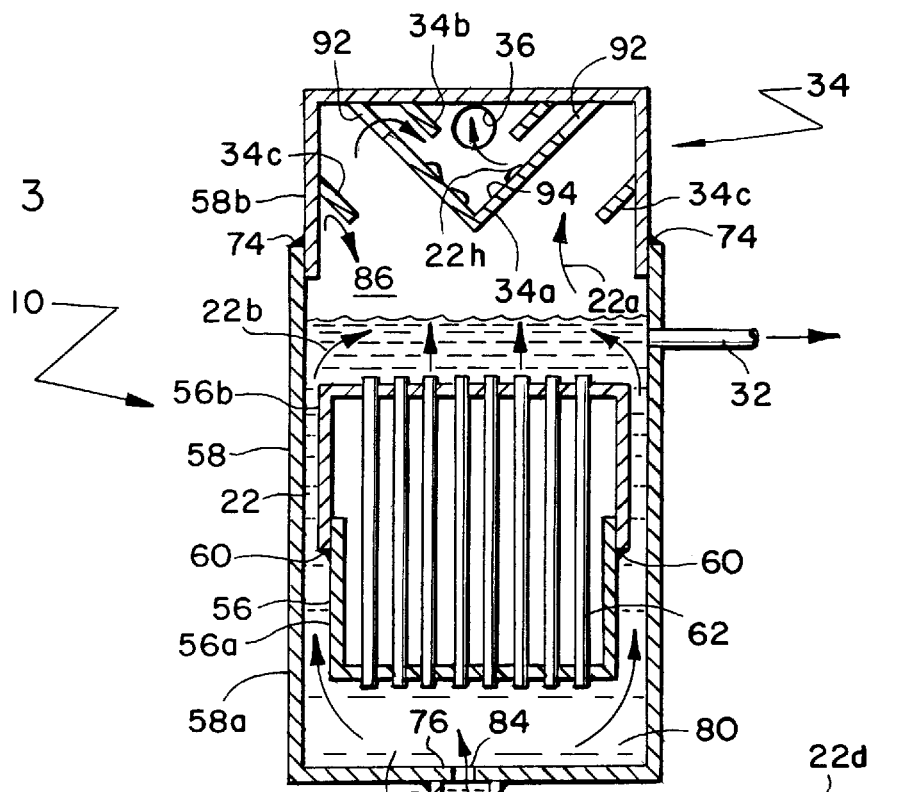
FIG. 3 shows the generator of FIG. 1 in a cross-sectional view taken along line 3—3 of FIG. 2.
Figure 2:
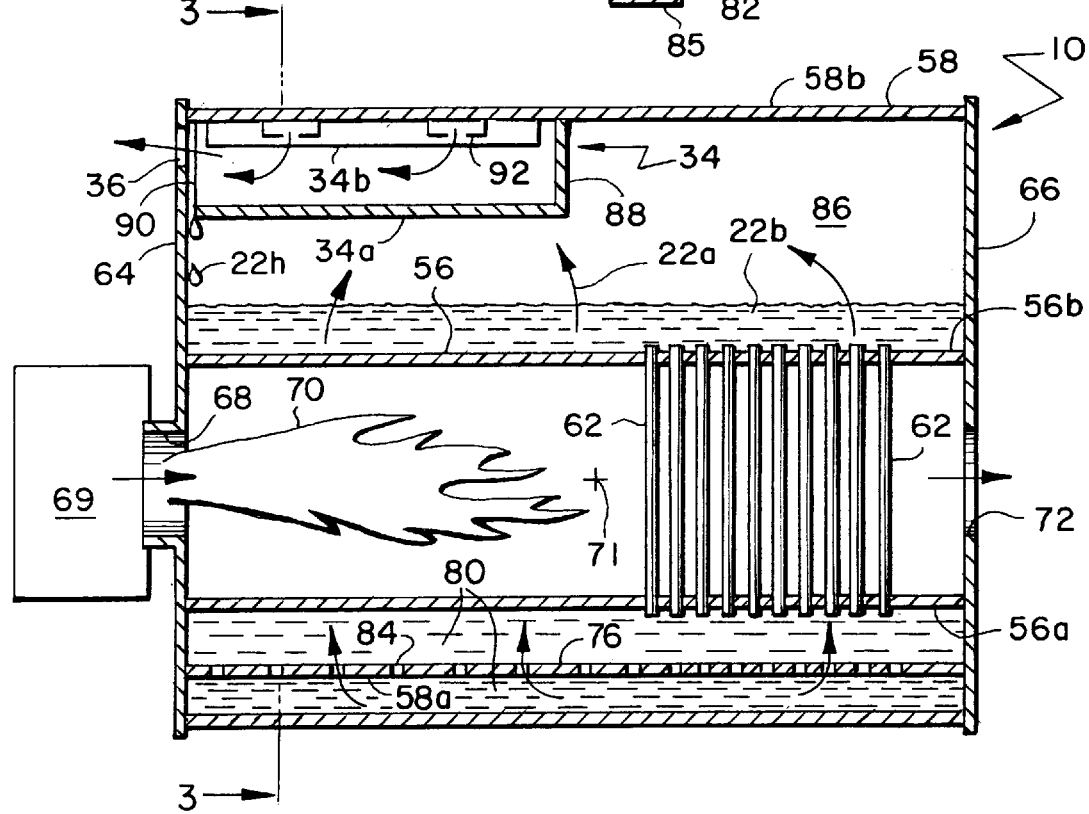
FIG. 2 shows the generator of FIG. 1 in a cross-sectional view taken along line 2—2 of FIG. 1.

Referring primarily now to FIGS. 2 and 3, the structure of direct-fired, high temperature generator 10 includes an inner shell 56 surrounded by an outer shell 58. Inner shell 56 includes a generally U-shaped lower inner shell section 56a and an inverted, generally U-shaped upper inner shell section 56b. Each of sections 56a and 56b is preferably a unitary piece which is continuously formed from end to end. That is, the U-shape is preferably not created by a series of individual panels welded or otherwise fastened together though they could be. Sections 56a and 56b are welded along two substantially parallel lap joints 60. To avoid or minimize corrosion at joints 60, lower shell section 56a fits inside upper section 56b which prevents the creation of a pocket or ledge on which liquid solution 22b might otherwise collect. Shell 56, once assembled, comprises a two-piece fire tube/tube sheet assembly of simple design and manufacture having open rectangular ends.

A tube bundle 62, which includes a group of vertical heat transfer tubes through which solution is conveyed upward within generator 10, extends across the interior of inner shell 56. The upper and lower tube ends are welded to upper and lower shell sections 56b and 56a respectively. The welds are made on the solution side of the tube/shell interface to avoid corrosion of the weld by exposure to combustion products. End plates 64 and 66 are then welded to opposite ends of the inner shell.

End plate 64 includes vapor outlet 36, as earlier noted, and a combustion inlet 68 to which burner 69 is attached and through which a burning combustion fluid 70 is introduced into the interior of shell 56, generally upstream of the tube bundle in an area referred to as the fire tube portion of the shell. End plate 66 includes a combustion outlet 72 through which combustion products exit the shell's interior after making a single pass therethrough.

Once welded together, inner shell sections 56a and 56b, tube bundle 62, and end plates 64 and 66 can be readily leak checked as a unit by attaching leak check covers to the combustion inlet and outlet. If a leak is discovered, all welded joints are readily accessible for repair.

Similar in construction to inner shell 56, outer shell 58 includes a generally U-shaped lower outer shell section 58a and an inverted, generally U-shaped upper outer shell section 58b. Like the sections of inner shell 56, each of sections 58a and 58b is preferably a continuously formed piece, as opposed to being created by a series of individual panels, and are welded/joined along two substantially parallel lap joints 74. To avoid or minimize corrosion due to liquid collection and stagnation at the joint location, upper shell section 58b fits inside lower section 58a.

Before welding sections 58a and 58b together, vapor separator assembly 34 which, in the preferred embodiment, includes a V-shaped trough 34a, inner deflectors 34b and outer deflectors 34c, is assembled into upper outer shell section 58b. Outer shell sections 58a and 58b are then welded along lap joints 74 and end plates 64 and 66 are welded thereto.

In operation, solution 22d, of intermediate concentration, enters solution inlet chamber 80, defined generally at the bottom of generator 10 and within channel 85, after passing through inlet 82. A liquid inlet flow distributor 76 can be created by providing lower shell section 58a with apertures 84 and enclosing those apertures within channel 85 which is welded to the underside of lower shell section 58a. Channel 85 can, but need not, be considered to be an integral part of lower section 58a and distributor 76 could be configured so as to be disposed internal of inlet chamber 80.

Apertures 84 can vary in size and/or spacing to apportion and restrict, in a controlled manner, the flow of solution into the interior of outer shell 58. Those of apertures 84 which are located under tube bundle 62 are preferably larger and/or their spacing is closer so as to cause more solution to flow upward and into tube bundle 62 than flows upward between the walls of shells 56 and 58. For that reason, most of the heat transfer between combustion fluid 70 and solution 22 within generator 10 is at the location of the tube bundle. Regardless of which flow path the solution follows, it makes its way into a outlet chamber 86 which is located within shell 58, above inner shell 56.

The vaporization of solution that occurs within generator 10 as a result of its being heated creates a more concentrated solution 22b in the upper region of the generator. That solution readily mixes with and assimilates the incoming, less concentrated solution 22d which itself becomes more concentrated in its flow upward through the generator.

As hot combustion products travels from inlet 68 to outlet 72 within inner shell 56, they make a single pass across the exterior of tube bundle 62 thereby heating the solution flowing inside the tubes. However, a significant amount of heat also transfers through the walls of inner shell 56 and heats the portion of the solution that flows upward between the walls of the inner and outer shells.

In the preferred embodiment, tube bundle 62 takes up less than half the interior volume of inner shell 56 which leaves ample space for open-flame combustion upstream of the tube bundle without having to resort to a special, more costly burner that produces a compact flame for purposes of avoiding direct and detrimental flame contact with the exterior of the tubes of the tube set. Generally speaking, most or all of tube bundle 62 is downstream of midpoint 71 of the length of generator 10 in the preferred embodiment.

Vapor 22a travels out of outlet chamber 86 within generator 10, into and through separator 34 which helps to disentrain any liquid from the vapor 22a prior to its exit from the generator interior. Outer deflectors 34c operate to initially deflect liquid solution that may spew upward from between the walls of shells 56 and 58 away from trough 34a and from vapor outlet 36 which is found therein. One end 88 of trough 34a is blocked off while an opposite end 90 is open to vapor outlet 36. Inlet slits 92 along upper edges of trough 34a allow vapor 22a to enter the trough's interior.

Once inside trough 34a, the geometry of the trough and its interior deflectors 34b cause the vapor to swirl generally along the length of the trough. That swirling motion slings remaining liquid droplets 22h within vapor 22a against an interior surface 94 of the trough. Those droplets accumulate along the bottom of the trough until sufficient in amount to drain out of the trough's open end 90. The net result of the separator configuration is that vapor 22a exits through vapor outlet 36 only after traveling through a tortuous path and after much of its previously entrained liquid is removed.

Although the generator of the present invention is described with reference to a preferred embodiment, it will be appreciated by those skilled in the art that other variations are well within the scope of the invention. For example, generator 10 can be used in single-stage or multi-stage absorption chillers. Also, the various components of chiller 12 can be rearranged in a variety configurations. The shells of generator 10, auxiliary generator 20, condenser 14, absorber 18, and evaporator 16 can be individual shells interconnected by piping or various combinations of shells which share a common wall. Therefore, the scope of the invention is to be determined only with reference to the claims, which follow.

We claim:

1. A generator for an absorption chiller that uses a burning combustion fluid to heat a solution, comprising:

a tube bundle, said tube bundle conveying said solution through a first solution flow path in a heat exchange relationship with said combustion fluid;

an inner shell, said inner shell being vertically traversed by said tube bundle and defining a combustion inlet and a combustion outlet, said burning combustion fluid and the combustion products thereof flowing in a single pass from said combustion inlet, across said tube bundle, to and out of said combustion outlet;

an outer shell, said outer shell defining a liquid solution outlet and a vapor solution outlet, said outer shell cooperating with said inner shell to define a solution inlet chamber, a solution outlet chamber and a second solution flow path in parallel with said first solution flow path, a first portion of said solution flowing through said liquid solution inlet, through said solution inlet chamber, through said first solution flow path and into said solution outlet chamber and a second portion of said solution flowing through said liquid solution inlet, through said solution inlet chamber, through said second solution path and into said solution outlet chamber; and a distributor in flow communication with said solution inlet chamber, said distributor causing more solution flow through said first solution flow path than through said second solution flow path.

2. The absorption generator of claim 1 wherein said combustion fluid path through said inner shell has a midpoint generally halfway between said combustion fluid inlet and said combustion fluid outlet, at least a majority of the tubes of said tube bundle being downstream of said midpoint with respect to the direction of flow of said combustion fluid.

3. The absorption generator of claim 2 wherein all of the tubes of said tube bundle are downstream of said midpoint.

4. The absorption generator of claim 1 wherein said flow distributor is attached to said outer shell and is in flow communication with said inlet chamber through a plurality of apertures defined in said outer shell.

5. The absorption generator of claim 4 wherein said apertures are spaced and/or sized to deliver more solution to said first solution flow path than to said second solution flow path.

6. The absorption generator of claim 1 further comprising a liquid-vapor separator disposed within said solution outlet chamber, said separator having an inlet, the interior of said separator being in flow communication with said separator inlet and said vapor outlet.

7. The absorption generator of claim 6 wherein said liquid-vapor separator is configured to impart a swirling motion to solution received through said separator inlet.

8. The absorption generator according to claim 6 wherein said liquid-vapor separator includes a trough having a blocked end and an open end, said trough being configured to receive solution from said solution outlet chamber through said separator inlet, to convey a portion of said received solution, in a vaporous state, through said open end of said separator to said vapor solution outlet, to convey a portion of said received solution in a liquid state along an interior surface of said trough to said open end, and to drain said liquid portion of said received solution out of said open end of said trough back into said solution outlet chamber.

9. The absorption generator of claim 8 wherein, said liquid-vapor separator includes an inner deflector disposed within said trough adjacent to said trough inlet, said inner deflector directing solution entering said trough said separator inlet toward said interior surface of said trough.

10. The absorption generator of claim 9 wherein said liquid-vapor separator includes an outer deflector disposed in said solution outlet chamber, said outer deflector being positioned to deflect solution entering said solution outlet chamber from said second solution path away from said inlet to said liquid-vapor separator.

11. The absorption generator of claim 1 further comprising a first end plate, in which said combustion fluid inlet and said vapor solution outlet are defined, and a second end plate, in which said combustion fluid outlet is defined, said first and second end plates each being attached to said inner shell and said outer shell in a leak-tight manner.

12. The absorption generator of claim 11 further comprising a liquid-vapor separator, said separator being disposed adjacent said vapor solution outlet defined by said first end plate.

13. The absorption generator of claim 1 wherein said outer shell includes a generally U-shaped lower outer shell section and an inverted generally U-shaped upper outer shell section.

14. The absorption generator of claim 13 wherein said lower outer shell section has two edges joined to said upper outer shell section to create two substantially parallel leak-tight joints, said two edges of said lower outer shell section being attached to the exterior of said upper outer shell section.

15. The absorption generator of claim 13 wherein one end of the tubes of said tube bundle are welded to said lower inner shell section and the other end of the tubes of said tube bundle are welded to said upper inner shell section.

16. The absorption generator of claim 1 wherein said inner shell includes a generally U-shaped lower inner shell section and an inverted generally U-shaped upper inner shell section, said upper inner shell section having two edges joined to said lower inner shell section to create two substantially parallel leak-tight joints.

17. The absorption generator of claim 16 wherein said two edges of said upper inner shell are joined to the exterior of said lower inner shell section.

18. A generator for an absorption chiller that uses a burning combustion fluid to heat a solution, comprising:

a tube bundle adapted to convey said solution through a first solution flow path in heat exchange relationship with said combustion fluid;

an inner shell in which said tube bundle is disposed, said inner shell defining a combustion fluid inlet, a combustion fluid outlet and a combustion fluid path through which said combustion fluid makes only one pass across said tube bundle in traveling from said combustion fluid inlet to said combustion fluid outlet, said inner shell having a generally U-shaped lower inner shell section and an inverted generally U-shaped upper inner shell section; and an outer shell defining a liquid solution inlet, a liquid solution outlet and a vapor solution outlet, said outer shell being disposed around said inner shell to define therebetween a solution inlet chamber, a solution outlet chamber and a second solution flow path in parallel with said first solution flow path, a first portion of said solution flowing through said liquid solution inlet, through said solution inlet chamber, through said first solution flow path and into said solution outlet chamber and a second portion of said solution flowing through said liquid solution inlet, through said solution inlet chamber, through said second solution flow path and into said solution outlet chamber.

19. The absorption generator of claim 18 further comprising a flow distributor that directs more solution flow into said first solution flow path than into said second solution flow path.

20. The absorption generator according to claim 19 further comprising a liquid-vapor separator disposed in said solution outlet chamber adjacent said vapor solution outlet, said separator having an inlet into which said solution flows.

21. The absorption generator according to claim 20 wherein said combustion fluid inlet and said vapor solution outlet are on one end of said generator and said combustion fluid outlet is at a second end of said generator, said combustion fluid entering said inner shell, combusting adjacent said combustion fluid inlet in a flame producing process and proceeding therefrom down said combustion fluid path, in the form of products of combustion, toward said combustion fluid outlet, said tube bundle being disposed in said inner shell downstream of said flame.

22. The absorption generator of claim 18 wherein said combustion fluid path has a midpoint halfway between said combustion fluid inlet and said combustion fluid outlet, most of the tubes of said tube bundle being downstream of said midpoint with respect to the direction of flow of said combustion fluid.

23. The absorption generator of claim 22 wherein all of the tubes of said tube bundle are downstream of said midpoint.

24. The absorption generator of claim 18 further comprising a liquid-vapor separator disposed within said solution outlet chamber, said liquid-vapor separator comprising a trough, said trough having a blocked end and an open end and defining a trough inlet located between said blocked end and said open end, said trough receiving solution from said outlet chamber through said trough inlet, discharging a portion of said solution, in a vaporous state, through said open end and into said vapor solution outlet, conveying a portion of said solution in a liquid state along an interior surface of said trough and draining said solution portion in said liquid state from said interior surface back into said solution outlet chamber.

25. The absorption generator of claim 24 wherein said liquid-vapor separator further comprises an inner deflector disposed within said trough, adjacent to said trough inlet, said inner deflector directing solution from said trough inlet toward said interior surface of said trough.

26. The absorption generator of claim 25 further comprising an outer deflector disposed in said solution outlet chamber between said trough and said outer shell, said outer deflector being adapted to deflect the portion of said solution that enters said solution outlet chamber from said second solution flow path away from said trough inlet.

27. The absorption generator of claim 18 wherein said outer shell has a generally U-shaped lower outer shell section and an inverted generally U-shaped upper outer shell section.

28. The absorption generator of claim 27 wherein said upper inner shell section has two edges joined to said lower inner shell section to create two substantially parallel leak-tight joints and wherein said lower outer shell section has two edges joined to said upper outer shell section to create two substantially parallel leak-tight joints.

29. The absorption generator of claim 28 further comprising a first end plate in which said combustion fluid inlet and said vapor solution outlet are defined and a second end plate in which said combustion fluid outlet is defined, said first and said second endplates cooperating with said upper inner shell section, said lower inner shell section, said upper outer shell section and said lower outer shell section to create said inner and said outer shells.

30. The absorption generator of claim 28 wherein said two edges of said lower inner shell section are joined to an interior surface inside of said upper inner shell section and said two edges of said lower outer shell section are joined to an exterior surface of said upper outer shell section.

31. The absorption generator of claim 18 wherein said tube bundle extends through said lower inner shell section to and through said upper inner shell section and wherein the tubes of said tube bundle are welded to said inner shell on the exterior of said inner shell so that said tube welds are not directly exposed to said combustion fluid.

32. A method of heating a solution with a combustion fluid in the generator of an absorption chiller, comprising the steps of:
conveying a first portion of said solution through a first solution flow path defined by a tube bundle;
conveying a second portion of said solution through a second solution flow path, said second flow path paralleling said first flow path, at least a portion of said second solution flow path being upstream of said tube bundle with respect to the direction of flow of said combustion fluid through said generator;
apportioning solution into said first solution flow path and into said second solution flow path so that the amount of solution flowing through said first solution flow path is larger than the amount of solution flowing through said second solution flow path;
conveying said combustion fluid across said tube bundle only one time, so as to heat said first portion of said solution flowing through said tube bundle;
heating said second portion of said solution in said second flow path with the same combustion fluid which is conveyed across said tube bundle; and
conveying both said first portion and said second portion of said solution to a location generally above said tube bundle.

33. The method according to claim 32 comprising the further step of conveying said solution from said location above said tube bundle into a liquid-vapor separator disposed proximate said location above said tube bundle.

34. The method according to claim 33 comprising the further steps of burning said combustion fluid, said burning step creating a flame; and, disposing said tube bundle in said generator so as not to be in direct contact with said flame.

35. The method of claim 34 comprising the further steps of disentraining solution which is in liquid form from solution which is in vapor form within said liquid-vapor separator; flowing solution in vapor form from which solution in liquid form has been disentrained out of said generator; and returning disentrained liquid solution to said location generally above said tube bundle.

36. The method of claim 35 comprising the further step of shielding the inlet of said liquid-vapor separator from solution conveyed to said location through said second solution flow path.

* * * * *

UNITED STATES PATENT AND TRADEMARK OFFICE
CERTIFICATE OF CORRECTION

PATENT NO.     : 6,601,405 B2
DATED          : August 5, 2003
INVENTOR(S)    : Ronald M. Cosby, II, Jeffrey D. Harms and Gordon C. Stewart It is certified that error appears in the above-identified patent and that said Letters Patent is hereby corrected as shown below:

Column 7,
Lines 7-8, "liquid solution outlet" should read -- liquid solution inlet --.

Signed and Sealed this

Sixth Day of July, 2004

JON W. DUDAS
*Acting Director of the United States Patent and Trademark Office*